(12) United States Patent
Park (10) Patent No.: US 11,083,180 B2
(45) Date of Patent: Aug. 10, 2021

(54) BAIT CAST REEL HAVING NON-SEPARATING TENSION KNOB

(71) Applicant: BANAX CO., LTD., Incheon (KR)

(72) Inventor: Tae Sik Park, Gyeonggi-do (KR)

(73) Assignee: BANAX CO., LTD., Incheon (KR)

( * ) Notice: Subject to any disclaimer, the term of this patent is extended or adjusted under 35 U.S.C. 154(b) by 85 days.

(21) Appl. No.: 16/582,987

(22) Filed: Sep. 25, 2019

(65) Prior Publication Data

US 2020/0245602 A1 Aug. 6, 2020

(30) Foreign Application Priority Data

Jan. 31, 2019 (KR) .......................... 10-2019-0012888

(51) Int. Cl.
*A01K 89/01* (2006.01)
*A01K 89/033* (2006.01)

(52) U.S. Cl.
CPC .................................. *A01K 89/051* (2015.05)

(58) Field of Classification Search
CPC . A01K 89/051; A01K 89/0155; A01K 89/045
See application file for complete search history.

(56) References Cited

U.S. PATENT DOCUMENTS 5,372,324 A * 12/1994 Sato ................. A01K 89/01923
242/312
6,029,922 A * 2/2000 Kim ...................... A01K 89/006
242/283
6,293,483 B1 * 9/2001 Sato .................... A01K 89/0155
242/289
6,364,230 B1 * 4/2002 Kawasaki .......... A01K 89/0155
188/181 A (Continued)

FOREIGN PATENT DOCUMENTS

JP 11046641 A 2/1999
JP 2002065126 A 3/2002

(Continued)

OTHER PUBLICATIONS

Office Action issued by the Korean Intellectual Property Office (KIPO) dated Jul. 31, 2020 in Korean patent application serial No. 10-2019-0012888.

(Continued)

*Primary Examiner* — Emmanuel M Marcelo
(74) *Attorney, Agent, or Firm* — Farjami & Farjami LLP (57) ABSTRACT

A bait cast reel having a non-separating tension knob is proposed. The bait cast reel is configured to prevent separation of a tension knob from a reel body even if the tension knob is fully unwound and loosened, and includes: a reel body having a spool shaft rotatably installed thereon; a cylindrical frame coupled to an opening on a side of the reel body; a click plate rotatably coupled to the opening on a side of a frame; a control plate supporting the spool shaft and coupled to a through-hole of the click plate; a tension knob having a threaded portion that corresponds to a threaded portion of the frame; a protruding step formed on an outer end of a wing-shaped protrusion formed to face the flange of the control plate; and a ring-shaped locking step formed on an inner circumferential edge of the click plate.

4 Claims, 6 Drawing Sheets (56) References Cited

U.S. PATENT DOCUMENTS

| | | | | |
|---|---|---|---|---|
| 6,460,793 | B1* | 10/2002 | Hirayama | A01K 89/015 |
| | | | | 242/313 |
| 6,481,657 | B1* | 11/2002 | Oishi | A01K 89/01557 |
| | | | | 242/289 |
| 7,789,336 | B1* | 9/2010 | Nakagawa | A01K 89/015 |
| | | | | 242/322 |
| 2003/0111569 | A1* | 6/2003 | Hitomi | A01K 89/01 |
| | | | | 242/321 |

FOREIGN PATENT DOCUMENTS

| | | |
|---|---|---|
| KR | 10-2005-0035965 A | 8/2005 |
| KR | 20-0460340 | 5/2012 |
| KR | 20-0460340 Y1 | 5/2012 |
| KR | 20-2013-0004509 U | 7/2014 |
| KR | 10-1884236 B1 | 8/2018 |

OTHER PUBLICATIONS

Decision to Grant a Patent issued by the Korean Intellectual Property Office (KIPO) dated Mar. 24, 202.1 in Korean patent application serial No. 10-2019-0012888.

* cited by examiner

BAIT CAST REEL HAVING NON-SEPARATING TENSION KNOB

CROSS REFERENCE TO RELATED APPLICATION

The present application claims priority to Korean Patent Application No. 10-2019-0012888, filed Jan. 31, 2019, the entire contents of which is incorporated herein for all purposes by this reference.

BACKGROUND OF THE INVENTION

Field of the Invention

The present disclosure relates to a bait cast reel and, more particularly, to a bait cast reel having a non-separating tension knob for preventing separation of a tension knob from a reel body when tightening or loosening the tension knob to adjust the weight of a lure or an optimal casting state.

Description of the Related Art

Unless stated otherwise in this specification, the contents described in this section are not the related art about the claims of this application and not all of the contents included in this section are regarded as the related art.

In general, bait cast reels are equipped with a tension knob to control torque of a spool mounted on the bait cast reels to wind or unwind a line by rotating. That is, it is possible to overcome backlash by tightening or loosening the tension knob, so it is possible to control the speed of the line that is unwound from the spool.

Figure 1:
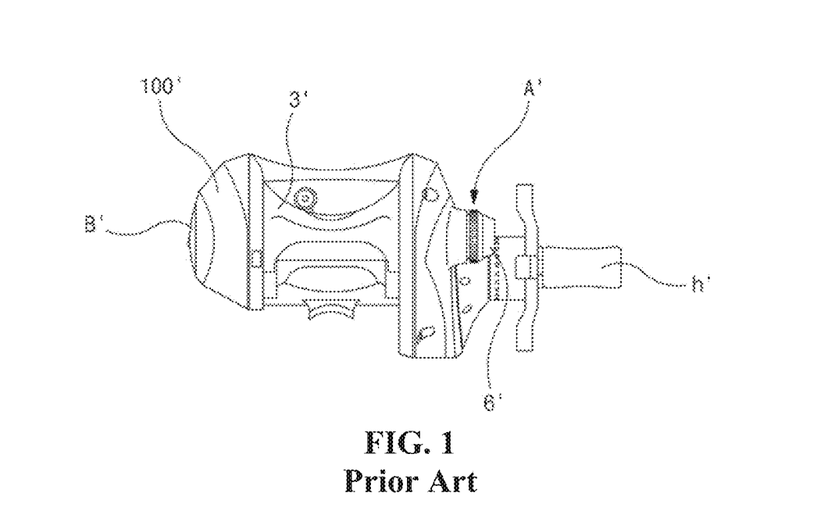
FIG. 1 is a schematic view of a normal bait cast reel.
Figure 2:
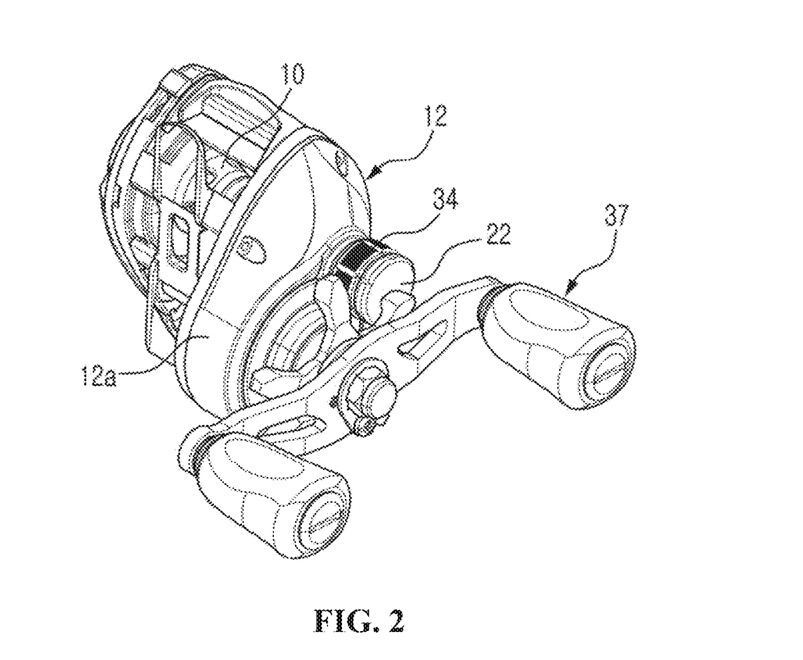
FIG. 2 is a perspective view of a bait cast reel having a non-separating tension knob according to an embodiment of the present disclosure.
Figure 3:
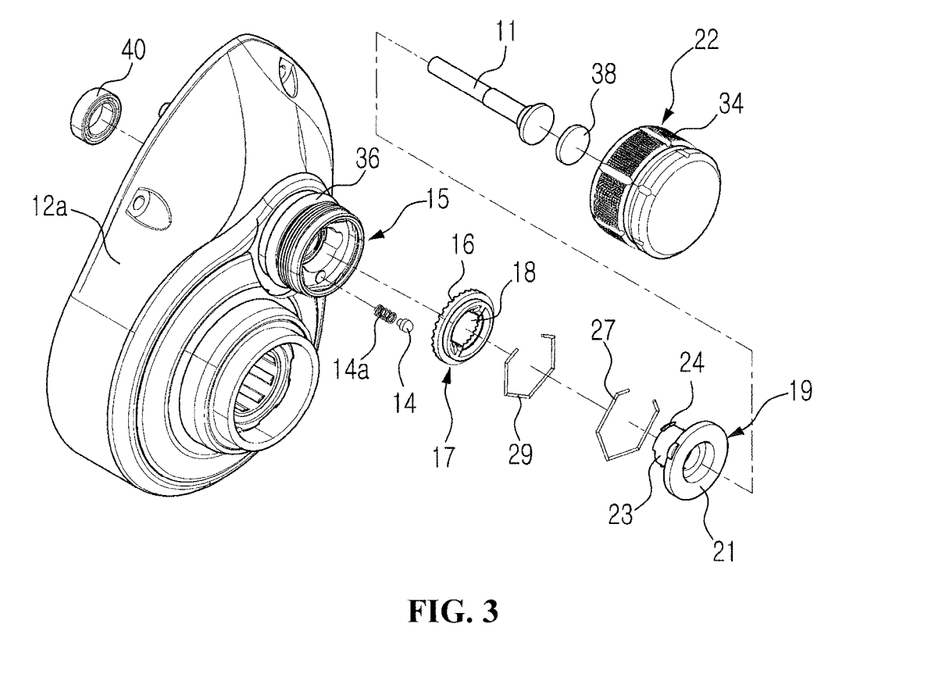
FIG. 3 is an exploded perspective view showing main parts of the bait cast reel shown in FIG. 2.

As shown in FIG. 1, a common bait cast reel includes:

a reel body 100' having side covers mounted on left and right sides thereof and equipped with a rotatable spool (not shown);

a thumb bar 3' mounted on the reel body 100' to kick a reel operation;

a handle h' mounted on a side of the reel body 100' to rotate the spool; and a mechanical brake A having a tension knob 6' formed on a side cover (not given a reference number).

When the tension knob 6' is tightened or loosened, a brake pad is brought in contact with the outer side by elasticity of a spring, thereby being able to control spool torque with mechanical friction.

A magnetic brake B' formed on the other side cover achieves a drag effect using repulsion between a magnet disposed therein and a magnet having the same polarity and disposed on the spool.

The tension knob 6' and the magnetic brake B' constitute a brake device for reducing backlash that causes continuous rotation due to the inertia of the spool that is rotated even after casting and positioning a lure.

Meanwhile, users frequently and freely operate the tension knob 6' to adjust the weight of lures and make an optimal state when casting to fit to fishing conditions. However, there is a problem in that when a user fully rotates and loosens the tension knob 6' and drops the tension knob 6' due to carelessness, the tension knob 6' is separated from the reel body 100' and lost.

Accordingly, there is a need for an anti-tension knob separation device that can prevent the tension knob 6' from separating from the reel body 100' and being lost even though the tension knob 6' is fully rotated and loosened to control spool torque in an optimal state when casting using a bait casting reel.

A minute adjustment click sound generating apparatus of a tension adjusting knob has been disclosed in Korean Utility Model No. 20-0460340.

SUMMARY OF THE INVENTION

An embodiment of the present disclosure relates to a bait cast reel having a non-separating tension knob, the bait cast reel being able to prevent separation of a tension knob from a reel body even if the tension knob is fully unwound and loosened to make an optimal casting state when casting.

An embodiment of the present disclosure relates to a bait cast reel having a non-separating tension knob, the bait cast reel in which a control plate rotates a click plate and generates a click when a tension knob is rotated even in a loosened state.

In order to achieve the above objects and other objects of the present disclosure, according to an embodiment of the present disclosure, there is provided a bait cast reel having a non-separating tension knob, the bait cast reel including:

a reel body having a spool shaft rotatably installed thereon;

a cylindrical frame coupled to an opening on a side of the reel body, having a first threaded portion on an outer side thereof, and having an elastic protrusion movably formed to generate a click;

a click plate rotatably coupled to the opening on a side of a frame and having click grooves circumferentially formed on a floor thereof to generate a click by clicking the elastic protrusion when rotating;

a control plate supporting the spool shaft and coupled to a through-hole of the click plate to integrally rotate;

a tension knob having a second threaded portion that corresponds to the first threaded portion of the frame and is formed on an inner circumferential edge thereof, having a flange of the control plate integrally fixed to an internal floor thereof, and rotating the control plate to adjust tension of the spool and generate a click when rotating;

a protruding step formed on an outer end of a wing-shaped protrusion formed to face the flange of the control plate; and a ring-shaped locking step formed on an inner circumferential edge of the click plate, whereby when the tension knob is fully unwound and loosened to adjust tension of the spool, the tension knob is locked to the locking step, so separation of the tension knob from the reel body is prevented.

The bait cast reel having a non-separating tension knob having the configuration according to an embodiment of the present disclosure has the following advantages.

Even if the tension knob is fully unwound and loosened to make an optimal casting state when casting, the tension knob idles at the position. Accordingly, even if a user drops the tension knob while turning the tension knob, it is possible to prevent the tension knob from being separated from the reel body and lost.

Further, even if the tension knob is rotated after the tension knob is fully loosened, the control plate rotates the click plate, so a click is generated and spool tension can be controlled.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereafter, a bait cast reel having a non-separating tension knob according to an embodiment of the present disclosure is described in detail.

Referring to FIGS. 2 to 8, a bait cast reel having a non-separating tension knob according to an embodiment of the present disclosure includes:

a reel body 12 on which a spool shaft 11 of a spool 10 on which a line is wound or unwound is installed to be rotatable by a bearing 40;

a cylindrical frame 15 that is coupled to an opening 12b on a side of the reel body 12, has a first threaded portion 13 on an outer side thereof, has an elastic protrusion 14 for generating a click movably supported by an elastic member 14a, and has two open ends;

a click plate 17 (e.g., a 6-nylon material may be used) that is rotatably coupled to the opening on a side of a frame 15 and has gear tooth-shaped click grooves 16 circumferentially formed with regular intervals on a floor thereof to generate a click by clicking the elastic protrusion 14 when rotating;

a control plate 19 (e.g., a 6-nylon material may be used) that supports the spool shaft 11 and is coupled to a through-hole 18 of the click plate 17 to integrally rotate;

a tension knob 22 that has a second threaded portion 20 corresponding to the first threaded portion 13 of the frame 15 and formed on an inner circumferential edge thereof, that has a flange 21 of the control plate 19 integrally fixed to internal floor thereof, rotates the control plate 19 to adjust tension of the spool 10 and generate a click when rotating, and is formed in a boss shape with a closed end;

a protruding step 24 that is formed on an outer end of a wing-shaped protrusion 23 extending to face the flange 21 of the control plate 19; and a ring-shaped locking step 25 that is formed on an inner circumferential edge of the click plate 17. Accordingly, when the tension knob 22 is fully unwound and loosened to adjust tension of the spool 10, the tension knob 22 is locked to the locking step 25, so separation of the tension knob 22 from the reel body 12 can be prevented.

According to another embodiment, the bait cast reel further includes: a first retainer 27 that is mounted on a first seat groove 6 formed on an inner side of the tension knob 22 to prevent the control plate 19 from separating from the tension knob 22; and a second retainer 29 that is mounted on a second seat groove 28 formed on an inner circumferential edge of the opening on a side of the frame 15 to prevent the click plate 17 from separating from the frame 15 and to support the click plate 17 to be in close contact with the elastic protrusion 14.

The bait cast reel further includes a first inclined surface 30 foiled to be inclined toward a center on an outer side of the protrusion step 24 of the control plate 19; and a second inclined surface 31 formed to be inclined toward a center on an outer side of the locking step 25 of the click plate 17.

Accordingly, when the control plate 19 is coupled to the click plate 17, the first inclined surface 30 slides on the second inclined surface 31, whereby the plates are coupled.

The bait cast reel further includes: a key groove 32 formed to face the wing-shaped protrusion 23 of the control plate 19; and a key protrusion 33 formed to face the inner circumferential edge of the 17 and correspond to the key groove 32, and coupled to the key groove 32.

Accordingly, after the second threaded portion 20 is disengaged from the first threaded portion 13 and the tension knob 22 is fully loosened, when the control plate 19 is rotated, a click is generated by rotation of the click plate 17.

The bait cast reel further includes a non-slip knurling portion 34 formed on an outer circumferential edge of the tension knob 22.

The bait cast reel further includes an O-ring 36 mounted on a third seat groove 35 formed on the outer side of the frame 15 to prevent dirt from entering inside through a gap between the outer side of the frame 15 and the inner side of the tension knob 22.

Reference numeral 37 not stated above and shown in the figures indicates a handle for rotating the spool 10 and reference numeral 38 indicates a friction member mounted on the floor inside the tension knob 22 to reduce the rotational speed of the spool shaft 11 when the tension knob 22 is tightened.

Hereafter, a use example of the bait cast reel having a non-separating tension knob according to an embodiment of the present disclosure is described with reference to the accompanying drawings.

As shown in FIGS. 2 to 8, the spool shaft 11 for rotating the spool 10 is rotatably disposed inside the reel body 12 by the bearing 40. An end of the spool shaft is positioned in the opening 12b on a side of the reel body 12 through a side cover 12a coupled to a side of the reel body 12.

Separation of the click plate 17 from the frame 15 can be prevented by the second retainer 29 mounted in the second seat groove 29 formed in an upper end opening of the frame 15 coupled to the opening 12b and having two open ends.

The O-ring 36 is mounted in the third seat groove 35 formed on the outer side of the frame 15. Accordingly, as dust, rain, etc. can be prevented from permeating into the first thread portion 13 of the frame 15, the second thread potion 20 of the tension knob 22 thread-coupled to the first threaded portion 13, and the tension knob 22 by the O-ring 36 mounted in the gap between the outer side of the frame 15 and the inner side of the tension knob 22.

Separation of the control plate 19 from the tension knob 22 can be prevented by the first retainer 27 mounted in the first seat groove 26 formed inside the tension knob 22.

The first retainer 27 mounted in the first seat groove 26 to prevent separation of the control plate 19 and the second retainer 29 mounted in the second seat groove 28 to prevent separation of the click plate 17 may be formed in an elastic multi-bending bar shape of a coil such as a wire.

Accordingly, the second threaded portion 20 of the tension knob 22 that is formed to correspond to the first thread portion 13 of the frame 15 coupled to the opening 12b of the reel body 12 is thread-fastened to the first thread portion 13, thereby being able to couple the tension knob 22 to the frame 15.

In this process, the key protrusion 33 formed to face the inner circumferential edge of the click plate 17 is coupled to the key groove 32 formed on the wing-shaped protrusion 23 of the control plate 19 to correspond to the key protrusion.

Figure 6:
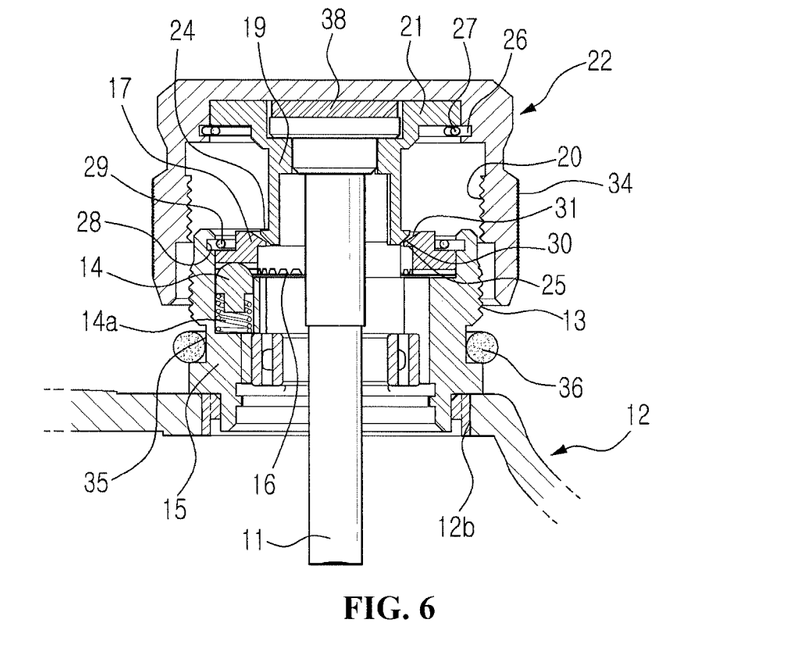
FIG. 6 is a cross-sectional view showing an initial state when the tension knob is combined with the reel body in the bait cast reel shown in FIG. 2.
Figure 7:
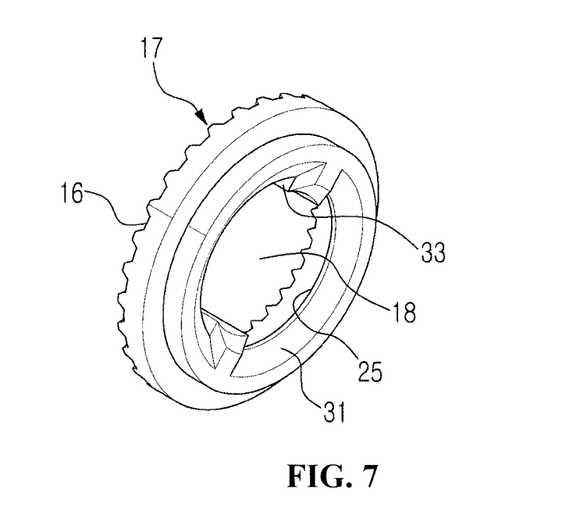
FIG. 7 is a perspective view a click plate in the bait cast reel shown in FIG. 2.
Figure 8:
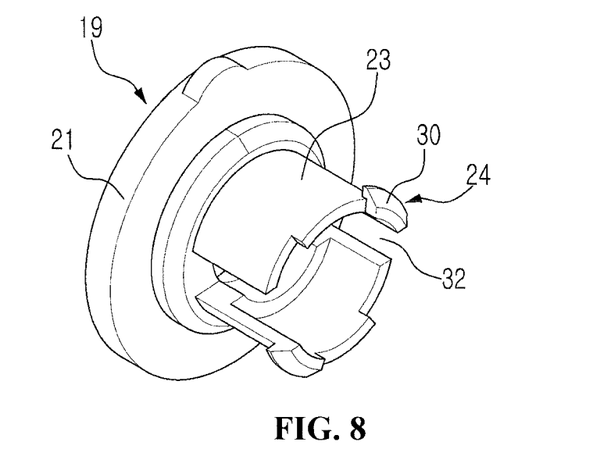
FIG. 8 is a perspective view a control plate in the bait cast reel shown in FIG. 2.

As shown in FIG. 6, when the control plate 19 is coupled to the through-hole 18 formed at the center of the click plate 17, the protruding step 24 formed at the outer end of the wing-shaped protrusion 23 of the control plate 19 passes through the locking step 25 formed in a ring shaped on the inner circumferential edge of the click plate 17.

In this process, the protrusion step 24 of the control plate 29 slides over the locking step 25 of the click plate 27 by the first inclined surface 30 the second inclined surface 31 formed to be inclined toward the centers of the protruding step 24 and the locking step 25, whereby coupling is smoothly made.

Figure 4:
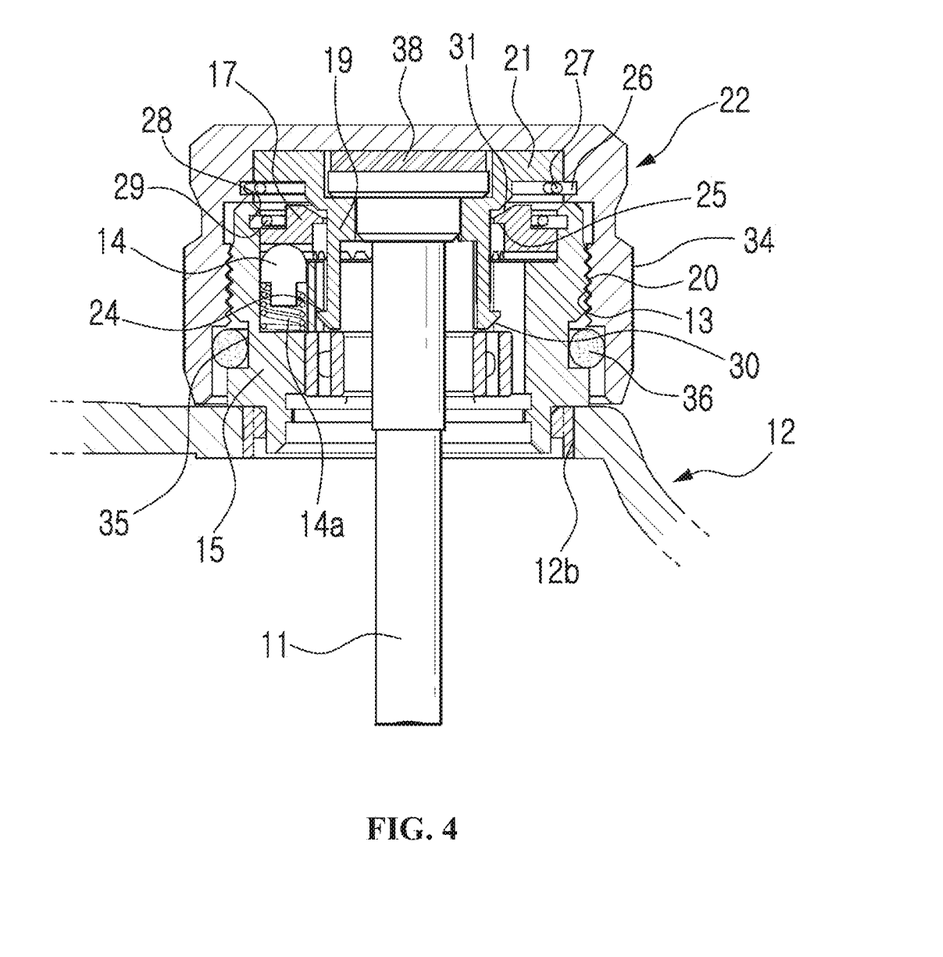
FIG. 4 is a cross-sectional view when a tension knob has been tightened with respect to a reel body in the bait cast reel shown in FIG. 2.

As shown in FIG. 4, the second threaded portion 20 of the tension knob 22 that is formed to correspond to the first thread portion 13 of the frame 15 coupled to the opening 12b of the reel body 12 is thread-fastened to the first thread portion 13, thereby being able to completely tighten the tension knob 22 to the reel body 12.

When a user holds and rotates the tension knob 22, the tension of the spool 10 on which a line is wound or unwound in accordance with the rotation amount is freely adjusted, so the rotational speed of the spool 10 can be adjusted.

In detail, when the tension knob 22 is rotated, the control plate 19 integrally fixed to the floor inside the tension knob 22 is also rotated.

Further, the key protrusion 33 of the click plate 17 is coupled to the key groove 32 formed at the wing-shaped protrusion 23 of the control plate 19, so the click plate 17 is integrally rotated by torque of the tension knob 22 transmitted through the control plate 19.

Accordingly, when the tension knob 22 is rotated, the rotation state of the tension knob 22 can be maintained and a click is also generated by interaction between the click grooves 16 formed circumferentially with regular intervals on the floor of the click plate 17 and the elastic protrusion 14 disposed to be able to click by the elastic member 14a (e.g., a compressive coil spring) mounted in a mounting groove (not given a reference numeral) of the frame 15.

The configuration in which when a user rotates the tension knob 22 and the tension knob 22 is maintained in the rotation state by the click grooves 16 formed on the floor of the click plate and the elastic protrusion 14 disposed on the frame 15 to be able to click by the elastic member 14a and a click is generated, is generally used in the field of the present disclosure, so the configuration is not described in detail.

Figure 5:
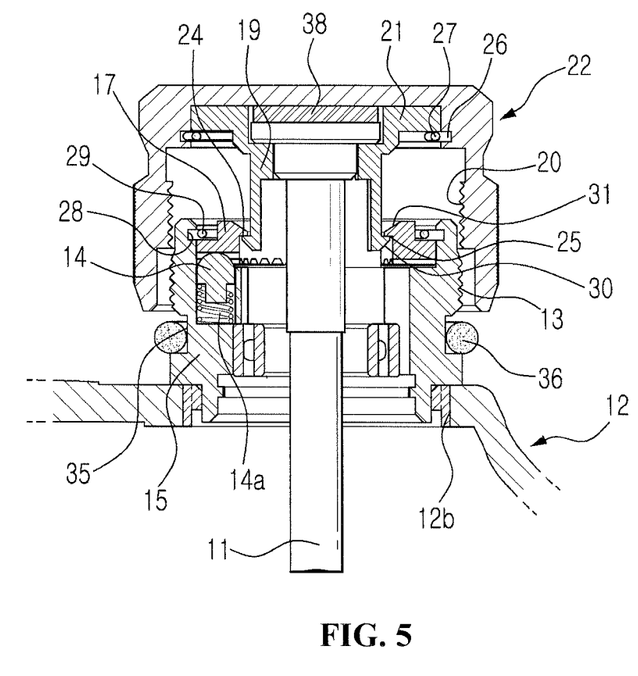
FIG. 5 is a cross-sectional view when the tension knob has been loosened with respect to the reel body in the bait cast reel shown in FIG. 2.

As shown in FIG. 5, when fully unwinding and loosening the tension knob 22 to adjust the weight of lures or an optical casting state, if the user drops the tension knob 22 due to carelessness, it is possible to prevent the tension knob 22 from being separated from the reel body 12 and lost.

In detail, when the tension knob 22 is fully rotated and loosened counterclockwise, the second threaded portion 20 formed on the inner circumferential edge of the tension knob 22 is disengaged from the first threaded portion 13 formed on the outer circumferential edge of the frame 15 to correspond to the second threaded portion.

In this process, the protruding step 24 formed at the outer end of the wing-shaped protrusion 23 of the control plate 19 having the flange 21 integrally fixed inside the tension knob 22 is locked to the locking step 25 formed in a ring shape at the center of the click plate 17.

Accordingly, even if the second threaded portion 20 of the tension knob 22 is completely separated from the first threaded portion 13 of the frame 15, the protrusion 24 of the control plate 19 keeps locked to the locking step 25 of the click plate 17.

Therefore, even if a user fully unwinds and loosens the tension knob 22 and drops the tension knob 22 due to carelessness, it is possible to prevent the tension knob 22 from being unwound from the frame 15 coupled to the reel body 12 and lost.

As shown in FIG. 5, when the tension knob 22 is rotated after it is fully unwound and loosened, a click can be generated by the interaction between the click grooves 16 of the click plate 17 integrally rotating with the control plate 19 and the elastic protrusion 14 of the frame 15.

In detail, even though the second threaded portion 20 of the tension knob 22 is fully loosened from the first threaded portion 13 of the frame 15, the key protrusion 33 extending from the inner circumferential edge of the click plate 17 keeps fitted in the key groove 32 formed at the wing-shaped protrusion 23 of the control plate 17.

Accordingly, even though the tension knob 22 has been fully unwound and loosened, when the tension knob 22 is rotated, the click plate 17 is rotated by the control plate 19. Therefore, a click can be generated by the interaction between the click grooves 16 formed on the floor of the click plate 17 and the elastic protrusion 14 of the frame 15 that is in contact with the click grooves 16.

The present disclosure was described with reference to embodiments herein, it should be understood that the present disclosure may be changed and modified in various ways by those skilled in the art without departing from the spirit and scope of the present disclosure described in the specification and the claims.

What is claimed is:

1. A bait cast reel comprising:
   a reel body having a spool shaft rotatably installed thereon;
   a cylindrical frame coupled to an opening on a side of the reel body, having a first threaded portion on an outer side thereof, and having an elastic protrusion movably formed to generate a click;
   a click plate rotatably coupled to an opening on a side of the frame and having click grooves circumferentially formed on a floor thereof to generate a click by clicking the elastic protrusion when rotating;
   a control plate supporting the spool shaft and coupled to a through-hole of the click plate to integrally rotate;
   a non-separating tension knob having a second threaded portion that corresponds to the first threaded portion of the frame and is formed on an inner circumferential edge thereof, having a flange of the control plate integrally fixed to an internal floor thereof, and rotating the control plate to adjust tension of the spool and generate a click when rotating;
   a protruding step formed on an outer end of a wing-shaped protrusion formed to face the flange of the control plate; and a ring-shaped locking step formed on an inner circumferential edge of the click plate, whereby when the non-separating tension knob is fully unwound and loosened to adjust tension of the spool, the non-separating tension knob is locked to the locking step, so separation of the non-separating tension knob from the reel body is prevented.

2. The bait cast reel of claim 1, further comprising:

a first retainer mounted on a first seat groove formed on an inner side of the non-separating tension knob to prevent the control plate from separating from the non-separating tension knob; and a second retainer mounted on a second seat groove formed on an inner circumferential edge of the opening on a side of the frame to prevent the click plate from separating from the frame and to support the click plate to be in close contact with the elastic protrusion.

3. The bait cast reel of claim 1, further comprising:

a first inclined surface formed to be inclined toward a center on an outer side of the protrusion step of the control plate; and a second inclined surface formed to be inclined toward a center on an outer side of the locking step of the click plate, whereby when the control plate is coupled to the click plate, the first inclined surface slides on the second inclined surface, so the plates are coupled.

4. The bait cast reel of claim 1, further comprising:

a key groove formed to face the protrusion of the control plate; and a key protrusion formed to face the inner circumferential edge of the click plate and correspond to the key groove, and coupled to the key groove, whereby after the second threaded portion is disengaged from the first threaded portion and the non-separating tension knob is fully loosened, when the control plate is rotated, a click is generated by rotation of the click plate.

* * * * *